United States Patent
Fujiyama et al.

(10) Patent No.: US 6,473,316 B2
(45) Date of Patent: Oct. 29, 2002

(54) PHASE CONTROL CIRCUIT AND SWITCHING REGULATOR

(75) Inventors: Toshiya Fujiyama, Tenri (JP); Masanori Inamori, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/963,611

(22) Filed: Sep. 27, 2001

(65) Prior Publication Data

US 2002/0036909 A1 Mar. 28, 2002

(30) Foreign Application Priority Data

Sep. 27, 2000 (JP) ........................................ 2000-294899

(51) Int. Cl.[7] .............................................. H02M 3/315
(52) U.S. Cl. ...................................... 363/17; 363/56.02
(58) Field of Search ........................... 363/16, 17, 21.1, 363/21.18, 26, 56.02, 95, 98, 131, 132

(56) References Cited

U.S. PATENT DOCUMENTS 4,409,648 A * 10/1983 Kobari et al. ................. 363/54
4,866,592 A * 9/1989 Fujii et al. ..................... 363/98
5,121,314 A * 6/1992 Cathell et al. ................. 363/17
5,291,384 A 3/1994 Mammano et al. ........... 363/17
5,301,098 A * 4/1994 Dhyanchand et al. ......... 363/97

* cited by examiner

*Primary Examiner*—Adolf Deneke Berhane
(74) *Attorney, Agent, or Firm*—Birch, Stewart, Kolasch & Birch, LLP (57) ABSTRACT

A phase control circuit which can stabilize voltage control when used in a switching regulator, and a switching regulator using such a phase control circuit are provided. A switching circuit for generating a first and a second output signals having opposite polarities based on a clock signal, is provided. A PWM latch circuit, reset by a reset signal, for generating a third and a fourth output signals which have phases controlled with respect to the first and the second output signals respectively by a set signal produced based on a control signal and come to have opposite polarities, is provided. A delay circuit for delaying the rising of each of the first through the fourth output signals before outputting each of the first through the fourth output signals is provided for each output signal. A delay clock pulse width setting circuit for generating a delay pulse based on low level periods of the delayed first and second output signals is provided so as to reset the PWM latch circuit using the delay pulse as the reset signal.

20 Claims, 8 Drawing Sheets

PHASE CONTROL CIRCUIT AND SWITCHING REGULATOR

FIELD OF THE INVENTION

The present invention relates to a phase control circuit appropriately used in a resonant switching regulator, etc. which adopts soft switching so as to reduce switching loss, and the resonant switching regulator provided with the phase control circuit.

BACKGROUND OF THE INVENTION

Conventionally, as for a phase control circuit for a switching regulator, a structure disclosed in U.S. Pat. No. 5,291,384 (Date of Patent: Mar. 1, 1994) has been known. A phase control circuit disclosed in the patent is structured so as to control a pulse width modulation (PWM) circuit which controls the phases of output signals A and B and output signals C and D, using an output pulse of an oscillation circuit.

Figure 6:
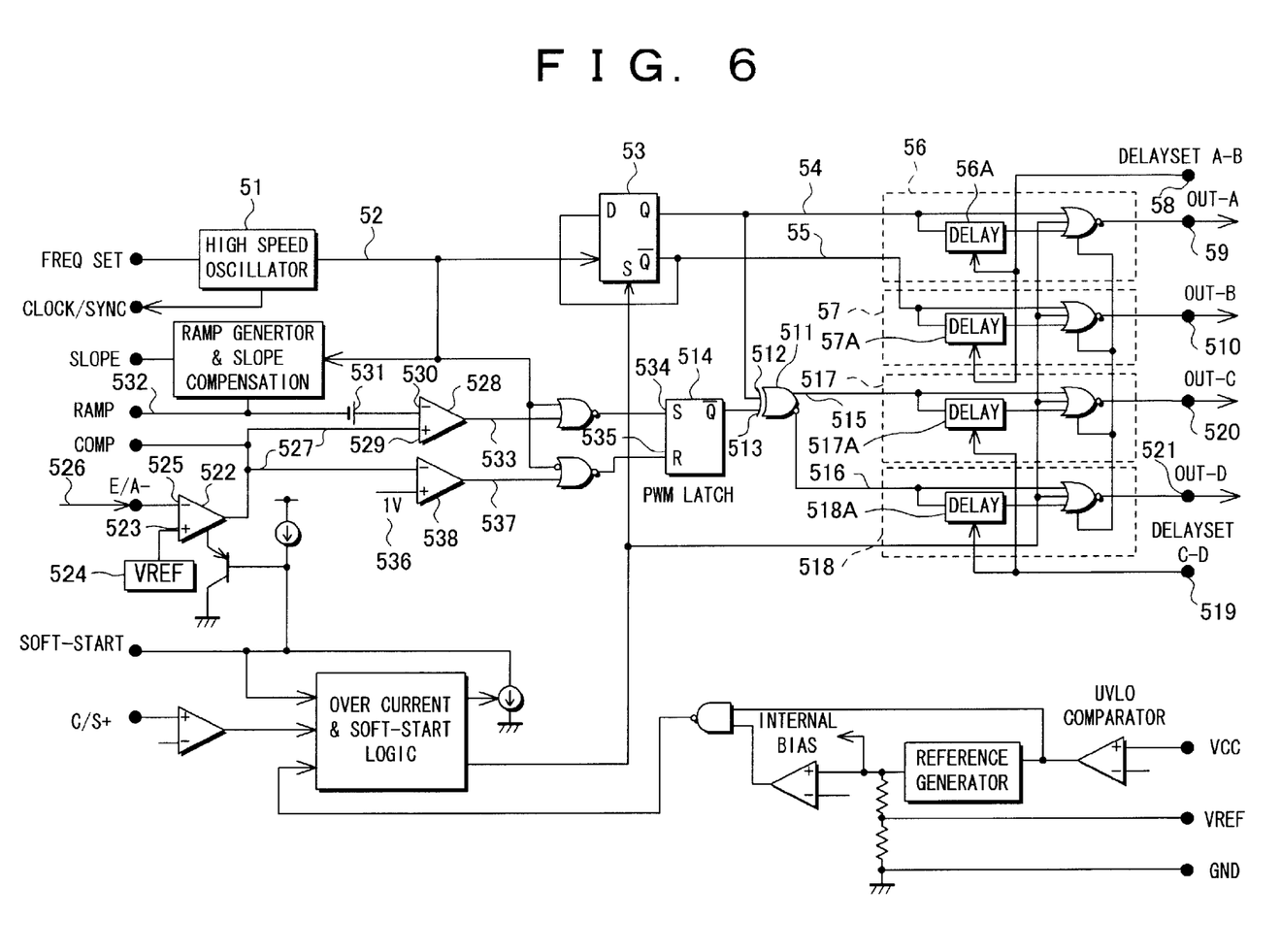
FIG. 6 is a block diagram showing one embodiment of a conventional phase control circuit (U.S. Pat. No. 5,291,384).

FIG. 6 shows a block diagram of the conventional phase control circuit. In FIG. 6, an output of a switching circuit 53 is switched by a clock signal 52 outputted from an oscillator 51.

Output signals XA 54 and XB 55 of the switching circuit 53 have opposite polarities, and are inputted to output circuits A 56 and B 57, respectively. Delay circuits 56A and 57A are provided in the output circuits A 56 and B 57, respectively, and a delay period of each of the delay circuits 56A and 57A is set by a delay set AB 58. Each of the delay circuits 56A and 57A causes a delay in the rising timing of an output signal A 59 outputted from the output circuit A 56, and in the rising timing of an output signal B 510 outputted from the output circuit B 57.

The output signal XA 54 of the switching circuit 53 is also connected to a first input terminal 512 of an XOR circuit 511. To a second input terminal 513 of the XOR circuit (exclusive OR) 511, a signal from an output terminal of a PWM latch circuit 514 is provided.

The XOR circuit 511 outputs output signals XC 515 and XD 516, and these output signals are inputted to output circuits C 517 and D 518, respectively. The output signals XC 515 and XD 516 have opposite polarities, in the same way as the foregoing output signals XA 54 and XB 55.

The output circuits C 517 and D 518 include delay circuits 517A and 518A, respectively, in the same way as the output circuits A 56 and B 57. A delay is caused in the rising timing of an output signal C 520 outputted from the output circuit C 517, and in the rising timing of an output signal D 521 outputted from the output circuit D 518, by a delay period set by a delay set CD 519.

In an error amplification circuit 522, a first reference voltage source 524 is connected to a positive input terminal 523, and a monitor signal voltage 526 is inputted to a negative input terminal 525. The voltages at the positive input terminal 523 and at the negative input terminal 525 are compared and their difference is amplified to form an error signal 527, which is inputted to two comparators 528 and 538.

To a positive input terminal 529 of the PWM comparator 528, one of the comparators, the error signal 527, which is an output signal of the error amplification circuit 522, is inputted. To a negative input terminal 530 of the PWM comparator 528, a ramp wave signal 532 formed according to the clock signal 52 is inputted via a level shift circuit 531.

The PWM comparator 528 compares the foregoing two signals and outputs a first error detection signal 533.

The first error detection signal 533 is inputted to a set terminal 534 of the PWM latch circuit 514 as an input signal only when the clock signal 52 is in a low level. In such a set input, the polarity of each of the output signals C 520 and D 521 is reversed, compared with the case where the PWM latch circuit 514 is in a reset state.

The PWM latch circuit 514, once set, keeps the output low until being reset by the clock signal 52. Besides, in the PWM latch circuit 514, while a signal is inputted to a reset terminal 535, no signal is applied to the set terminal 534, and the output of the PWM latch circuit 514 is always in a high level.

Another comparator 538, to which the error signal 527 as an output of the error amplification circuit 522 is inputted, compares a voltage level of the error signal 527 and a voltage level (for example, 1V) of a second reference voltage source 536. When the voltage level of the error signal 527 is lower than the voltage level of the second reference voltage source 536, the comparator 538 outputs a second error detection signal 537 (in a high level).

The second error detection signal 537 has a function to apply no signal according to the clock signal 52 to the reset terminal 535 of the PWM latch circuit 514. Hence, when the second error detection signal 537 is outputted, if a signal is inputted to the set terminal 534 of the PWM latch circuit 514 even just once, the output of the PWM latch circuit 514 is kept low unless the second error detection signal 537 is cancelled (becomes low).

Figure 7:
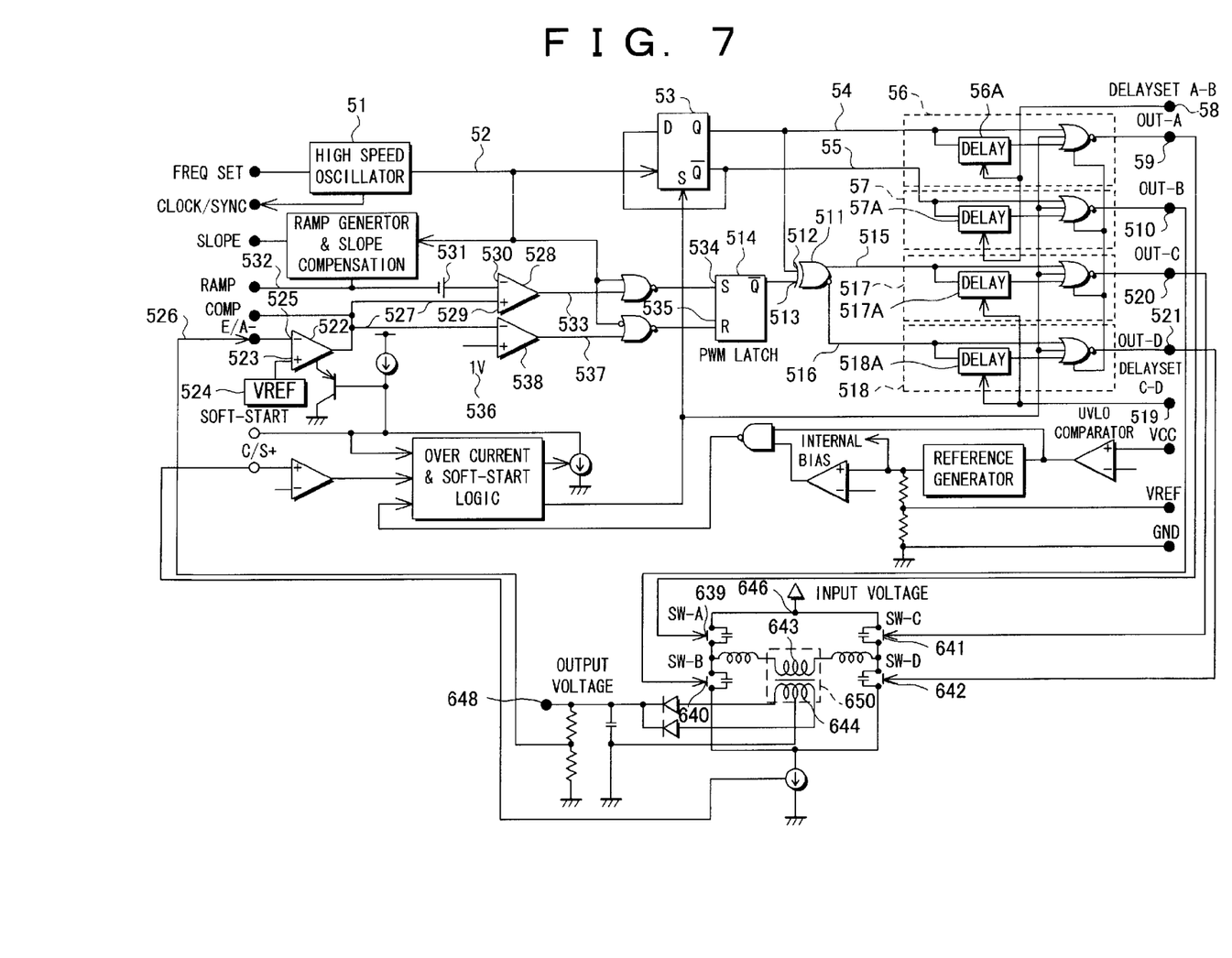
FIG. 7 is a block diagram showing one embodiment of a resonant switching regulator using a conventional phase control circuit.
Figure 8:
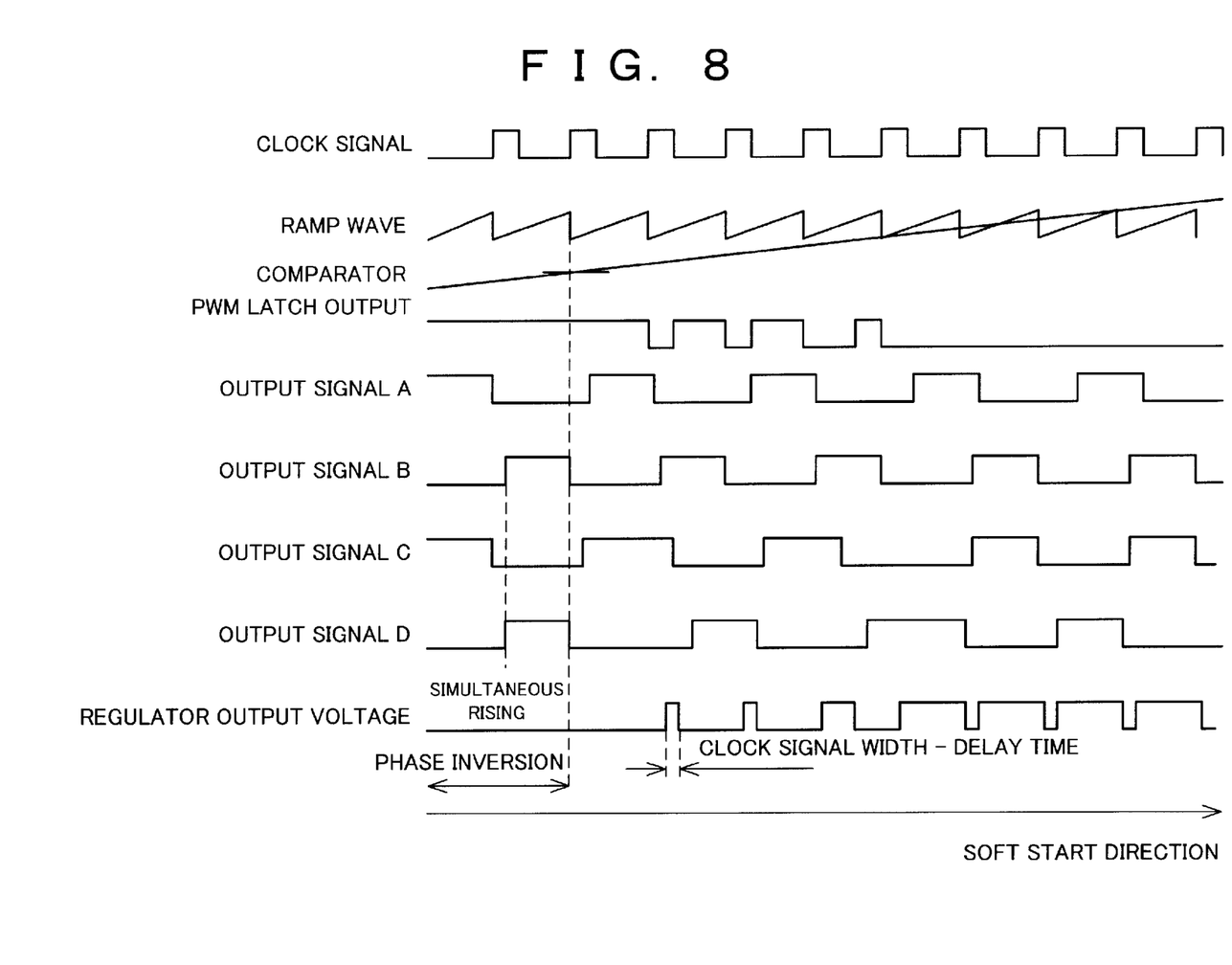
FIG. 8 is a timing chart showing the operation of the conventional resonant switching regulator shown in FIG. 7.

FIG. 7 shows a resonant switching regulator which controls regulator output voltage using the phase control circuit shown in FIG. 6. FIG. 8 shows a timing chart of the circuit shown in FIG. 7.

The output signals A 59, B 510, C 520, and D 521 of the phase control circuit are inputted as control signals for switches A 639, B 640, C 641, and D 642, respectively, of the resonant switching regulator. Here, the switches A 639 and D 642, and the switches B 640 and C 641 are paired respectively so as to transmit a current through a primary 643 and supply power to a secondary 644 of a transformer 650.

When this phase control circuit is used as a controller for the resonant switching regulator, the first reference voltage source 524 is connected to the positive input terminal 523 of the error amplification circuit 522. To the negative input terminal 525 of the error amplification circuit 522, the monitor signal voltage 526, formed by dividing the voltage of a regulator output terminal 648 to which power is supplied from the secondary 644 of the transformer 650, is supplied.

Here, in order to make the voltages inputted to the both input terminals of the error amplification circuit 522 equal, the phase control circuit controls the switching phases of the paired switches A 639, B 640, C 641, and D 642. Then, the phase control circuit adjusts power supply to the secondary 644 of the transformer 650, so that the voltage of the regulator output terminal 648 comes to have a desired voltage level set by the error amplification circuit 522, and thus a feedback control is applied in a system.

When the voltage level of the monitor signal voltage 526 is much lower than the reference voltage of the first reference voltage source 524 of the error amplification circuit 522, no high signal is applied to the set terminal 534 of the PWM latch circuit 514. Therefore, the output of the PWM latch circuit 514 becomes high. Here, the output signals of the paired output circuits have the same polarity, and the switching phases of the paired switches in the resonant switching regulator become 0 degree. Under these conditions, power is supplied to the secondary 644 of the transformer 650, except during dead time, which is a delay period.

When the voltage level of the monitor signal voltage 526 is much higher than the reference voltage of the first reference voltage source 524 of the error amplification circuit 522, the second error detection signal 537 is outputted. So no high signal is applied to the reset terminal 535 of the PWM latch circuit 514, and if a signal in a high level is inputted to the set terminal 534 even just once during this period, the output of the PWM latch circuit 514 becomes low. Here, the output signals of the paired output circuits come to have opposite polarities, and the switching phases of the paired switches in the resonant switching regulator become 180 degrees. In this situation, power is not supplied to the secondary 644 of the transformer 650.

When the voltage level of the monitor signal voltage 526 is close to the voltage level of the reference voltage of the first reference voltage source 524 of the error amplification circuit 522, according to the comparison by the PWM comparator 528, a signal is supplied to the set terminal 534 of the PWM latch circuit 514.

However, the sampling period for performing the phase control in the resonant switching regulator and the controlling transmission time of the transformer 650 in accordance with the voltage of the regulator output terminal 648 is only when the clock signal 52 of the oscillator 51 is in a low level.

However, the conventional circuit has the following problems. When the voltage level of the error signal 527 as an output signal of the error amplification circuit 522 varies from close to the minimum voltage of the ramp wave signal 532 formed according to the clock signal 52 to the voltage level of the second reference voltage source 536, the period in which the phases of the paired switches can vary is described as follows.

from 180—(Duty×180) degrees to 180 degrees (Duty=clock signal width÷oscillation cycle)

Here, since there is a period during which the voltage cannot be controlled (the period when the clock signal 52 is in a high level) although power is supplied to the secondary 644 of the transformer 650, the phase change switches logically, and linearity in phase deviation cannot be obtained. That is, the periods in which the paired output signals are simultaneously in a high level switch logically (discretely) in the intervals between when the pulse of the clock signal 52 falls and when the pulse rises again. This is because no signal is applied to the set terminal 534 of the PWM latch circuit 514 when the clock signal 52 is in a high level.

In other words, when the conventional circuit is used as a controller for a resonant switching regulator, in a period during which an input signal to the set terminal 534 cannot be inputted, the output of the PWM latch circuit 514 is high, so the input signals of the paired switches have the same polarity. As a result, a current is transmitted through the primary 643 of the transformer 650, and thus power is supplied to the secondary 644. Here, the switching phases of the paired switches become 180—(Duty×180) degrees.

In the circuit shown in FIG. 7, the ramp wave signal 532 is level-shifted to 1V and inputted to the PWM comparator 528. In the comparator 538, which has a function to apply no signal to the reset terminal 535 of the PWM latch circuit 514, the comparison reference voltage is also set at 1V.

With this structure, if the minimum voltage of the ramp wave signal 532 is 0V, when the voltage level of the error signal 527 outputted from the error amplification circuit 522 becomes lower than the minimum voltage of the ramp wave signal 532, no signal is applied to the reset terminal 535 of the PWM latch circuit 514. Then, the polarities of the input signals of the paired switches in the resonant switching regulator are reversed, and power supply to the secondary 644 of the transformer 650 is stopped. Here, the switching phases of the paired switches become 180 degrees.

In this manner, since the switching phase jumps from 180—(Duty×180) degrees to 180 degrees, linearity in phase deviation (that is, responsiveness) cannot be obtained, requiring time to stabilize the voltage at the regulator output terminal 648.

To solve such a problem, there is a method to narrow the width of the clock signal 52. However, since the oscillation frequency of the clock signal 52 is determined (set) by a load connected to the secondary 644 of the transformer 650 in the resonant switching regulator, it is desirable to set the operation range of the oscillation frequency wide so as to achieve versatility. When this is the case, the width of the clock signal 52 varies in a wide range according to the operation range of the oscillation frequency.

Since the range of phase deviation in which output linearity cannot be obtained is determined by a duty, as long as the oscillation frequency varies and the width of the clock signal 52 varies according to the variation of the oscillation frequency, the phase range in question does not vary. However, the time range in which output linearity cannot be obtained becomes greater with the decrease of the oscillation frequency.

As another countermeasure, there is a method to set the delay period of an output circuit greater than the width of the clock signal 52. During the delay period, all the switches in the resonant switching regulator do not conduct, which means dead time. Thus, since power is not supplied originally, there is no need to sample the voltage of the regulator output terminal 648.

However, since the delay period is provided so as to charge and discharge parasitic capacitors in the switches by resonance and to decrease switching loss, the delay period cannot be always set greater than the width of the clock signal 52 determined by a load.

There is another problem when the second error detection signal 537 is outputted. In this case, since the polarities of the input signals of the paired switches in the resonant switching regulator are reversed, a current is not transmitted through the primary 643 of the transformer 650, and thus power is not supplied to the secondary 644.

Here, the input signals of the switches which are not originally paired have the same polarity. If each switch has an identical parasitic capacitor, the delay in each output circuit is also set identical in many cases. If the delay period is identical and the second error detection signal 537 is outputted, the conduction start timings of the switches which are not originally paired coincide.

When the paired switches operate in phase, a current flows through the primary 643 of the transformer 650 and the switches are not subjected to stress so much. However, if the voltage of a regulator input terminal 646 is high and the conduction start timings of the switches which are not originally paired coincide when the transformer 650 is not in a transmission state, there is no current-flow path and excessive voltage is applied across the switches, so the switches are subjected to substantial stress momentarily. Therefore, the foregoing conventional switching regulator has a problem that the switches are easily deteriorated over time, failing to ensure stabilized operation for a long time.

SUMMARY OF THE INVENTION

It is therefore an object of the present invention to provide a phase control circuit which can stabilize voltage control when used in a switching regulator, and a switching regulator using such a phase control circuit.

To achieve the foregoing object, a phase control circuit in accordance with the present invention is structured so as to include:

a first pair of output stages for generating a first output signal and a second output signal based on a clock signal so that the first and the second output signals are pulse signals having opposite polarities;

a second pair of output stages, reset by a reset signal, for generating a third output signal and a fourth output signal which have phases controlled with respect to the first and the second output signals by the first and the second output signals respectively and also by a set signal produced based on a control signal, so that the third and the fourth output signals are pulse signals having opposite polarities;

first delay means for delaying, before output, the rising of the first through the fourth output signals; and delay pulse means for generating a delay pulse based on low level periods of the delayed first and second output signals, and for resetting the second pair of output stages using the delay pulse as the reset signal.

In the foregoing phase control circuit, it is desirable that a delay period is provided so as to reduce switching loss in a resonant switching regulator to which the first through the fourth output signals are connected.

It is also desirable that the foregoing control signal is a monitor signal in accordance with an output voltage of a resonant switching regulator to which the first through fourth output signals are connected.

According to the foregoing structure, a pulse signal whose pulse width is equal to a delay period of the first delay means is used as a reset signal for the second pair of output stages. With this structure, the second pair of output stages is reset, for example, in dead time of the resonant switching regulator. Therefore, the phase deviations of the third and the fourth output signals can be controlled from 0 degree to 180 degrees with respect to the first and the second signals, respectively, without being influenced by the variation in the frequency of the clock signal, obtaining linearity, that is, responsiveness.

Consequently, since linearity in phase deviation, that is, responsiveness, can be obtained in the foregoing structure, when using the foregoing structure in, for example, a resonant switching regulator, satisfactory voltage control can be achieved in the resonant switching regulator.

It is desirable that the phase control circuit further includes blocking means for blocking an input of a set signal to the second pair of output stages in a reset state, based on the delay pulse.

According to the foregoing structure, by providing the blocking means, a set signal is prevented from being inputted to the second pair of output stages during a reset period. Therefore, the phase deviations of the third and the fourth output signals with respect to the first and the second signals can be ensured, respectively, which can further stabilize voltage control.

It is desirable that the phase control circuit further includes second delay means for further delaying the third and the fourth output signals according to a period of a delay pulse.

According to the foregoing structure, in the case of using the foregoing structure in a resonant switching regulator, when the phase deviations of the third and the fourth output signals with respect to the first and the second signals are, for example, about 180 degrees, respectively, the first output signal and the third output signal come to be in phase.

Here, the simultaneous turning on of a first switch and a third switch among a first through a fourth switches which are provided in the resonant switching regulator and driven by the first through the fourth output signals, respectively, can be avoided by a delay produced by the second delay means.

In this manner, the foregoing structure can prevent excessive voltage from being applied to the first and the third switches, reducing stress to the switches. Consequently, the life of the switches can be prolonged, and thus, the operation of the resonant switching regulator can be stabilized and its operation life can be prolonged.

It is desirable that the phase control circuit further includes comparison means for detecting a control signal, so as to set all the first through the fourth output signals to a low level when the control signal becomes higher than a predetermined value.

According to the foregoing structure, in the case of using the foregoing structure in a resonant switching regulator, when an output voltage of the resonant switching regulator exceeds a tolerable value and the control signal based on the output voltage becomes higher than a predetermined value, the comparison means can stop the operation of the resonant switching regulator. Therefore, the foregoing structure can prevent the resonant switching regulator from getting out of control, and prevent a peripheral device from being damaged by the out-of-control resonant switching regulator.

It is desirable that, in the phase control circuit, when cancelling the low level setting for each output signal, the comparison means cancels the low level settings for the first and the second output signals, and after a delay period, the comparison means cancels the low level settings for the third and the fourth output signals.

According to the foregoing structure, in the case of using the foregoing structure in, for example, a resonant switching regulator, when cancelling the low level settings for all the output signals, the low level settings for the first and the second output signals are cancelled, and after a delay period, the low level settings for the third and the fourth output signals are cancelled. Therefore, this structure can avoid the simultaneous turning on of the switches causing a primary of a transformer of the resonant switching regulator not to conduct.

Thus, when using the foregoing structure in a resonant switching regulator, stress applied to the switches in the resonant switching regulator can be reduced. Consequently, the operation of the resonant switching regulator can be stabilized and its operation life can be prolonged.

To achieve the foregoing object, a switching regulator in accordance with the present invention is structured so as to include:

a first half bridge circuit including a first switch and a second switch, connected in series, which are turned on/off according to a high/low signal;

a second half bridge circuit including a third switch and a fourth switch, connected in series, which are turned on/off according to a high/low signal;

a transformer whose primary is connected to the first and the second half bridge circuits;

a resonant circuit, connected between the first and the second half bridge circuits in series with the primary of the transformer, for soft switching so as to decrease switching loss;

a rectifier circuit connected to a secondary of the transformer;

a control signal generator circuit for generating a control signal to feed back and control an output from the rectifier circuit, based on the output; and a phase control circuit for controlling the turning on/off of the first through the fourth switches, the phase control circuit including:

a first pair of output stages for generating a first output signal and a second output signal based on a clock signal so that the first and the second output signals are pulse signals having opposite polarities;

a second pair of output stages, reset by a reset signal, for generating a third output signal and a fourth output signal which have phases controlled with respect to the first and the second output signals by the first and the second output signals respectively and also by a set signal produced based on a control signal, so that the third and the fourth output signals are pulse signals having opposite polarities;

first delay means for delaying, before output, the rising of the first through the fourth output signals; and delay pulse means for generating a delay pulse based on low level periods of the delayed first and second output signals, and for resetting the second pair of output stages using the delay pulse as the reset signal, and the first through the fourth switches of the switching regulator being respectively connected to the first through the fourth output signals of the phase control circuit.

According to the foregoing structure, by using the foregoing phase control circuit, switching loss of the resonant circuit can be reduced by applying a delay. Besides, the phase deviations in the first and the second half bridge circuits can be controlled from 0 degree to 180 degrees, without being influenced by the variation in the frequency of the clock signal, obtaining linearity, that is, responsiveness.

As a result, since linearity in phase deviation of the switches, that is, responsiveness, can be obtained in the foregoing structure, satisfactory voltage control can be achieved for output.

For a fuller understanding of the nature and advantages of the invention, reference should be made to the ensuing detailed description taken in conjunction with the accompanying drawings.

DESCRIPTION OF THE PREFERRED EMBODIMENTS

Referring to the drawings, the following will describe one embodiment of the present invention in detail.

First Embodiment

Figure 1:
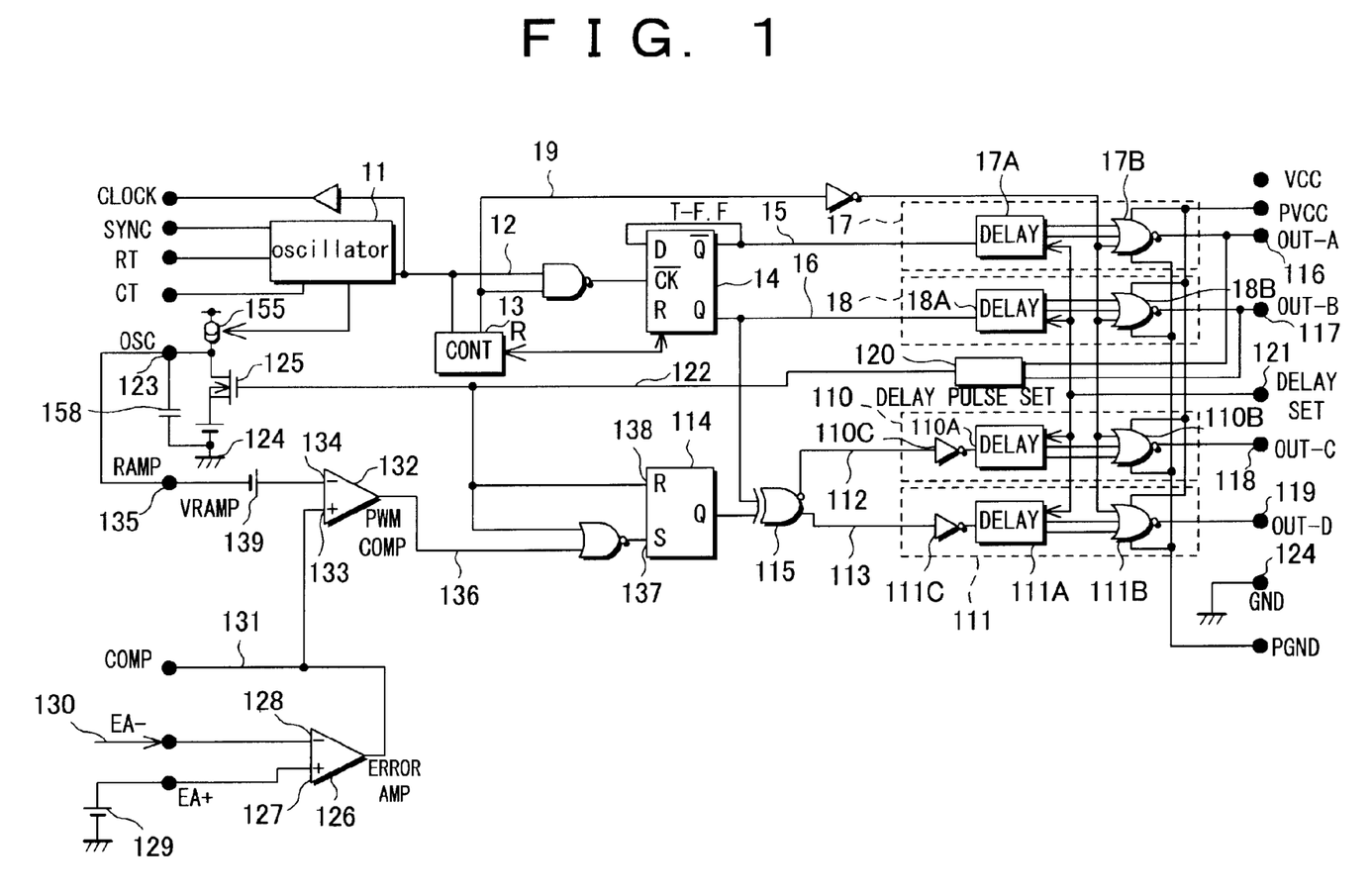
FIG. 1 is a block diagram showing one embodiment of a phase control circuit of the present invention.

FIG. 1 shows one embodiment of a phase control circuit of the present invention as a first embodiment.

In FIG. 1, an oscillator 11 outputs a clock signal 12 with an oscillation frequency set by an external instruction input. The oscillation frequency from the oscillator 11 sometimes becomes unstable when the power is turned on, etc.

To solve the problem, the clock signal 12 is first inputted to a counter (CONT) 13 and counted to reach the number of times enough to make the oscillation frequency stable. Then, the clock signal 12 is inputted to an input terminal ($\overline{CK}$) of a switching circuit 14 provided in the next stage. Examples of the switching circuit 14 include a T-type flip flop.

The switching circuit 14 is switched according to the clock signal 12, and outputs output signals XA 15 and XB 16. The output signals XA 15 and XB 16 have opposite polarities (one signal is in a low level while the other signal is in a high level), and are inputted to input terminals of output circuits A 17 and B 18, respectively.

The output circuit A 17 is provided with a delay circuit 17A and a first logic circuit 17B, and the output circuit B 18 is provided with a delay circuit 18A and a first logic circuit 18B. Each of the delay circuits 17A and 18A has a function to set a delay period which occurs when an output signal rises, and each of the first logic circuits 17B and 18B has a function to keep an output low until a counter completion signal 19 of the counter 13 is inputted.

Output circuits C 110 and D 111 are also provided with similar circuits and have similar functions as the output circuits A 17 and B 18. That is, the output circuit C 110 is provided with a delay circuit 110A, a first logic circuit 110B, and a second logic circuit 110C as an additional circuit. The output circuit D 111 is provided with a delay circuit 11A, a first logic circuit 111B, and a second logic circuit 111C as an additional circuit.

Examples of the first logic circuit include an NOR circuit, and examples of the second logic circuit include an inverter circuit.

Output signals XC 112 and XD 113 inputted to the output circuits C 110 and D 111, respectively, are made up of an output of an XOR circuit 115 to which the output signal XB 16 of the switching circuit 14 and an output signal of a PWM latch circuit 114 are inputted.

Here, the output signals XC 112 and XD 113 have opposite polarities, in the same way as the output signals XA 15 and XB 16. When a signal is not inputted to a set terminal of the PWM latch circuit 114, output signals A 116 and D 119 of the output circuits A 17 and D 111, respectively, have the same polarity, and output signals B 117 and C 118 of the output circuits B 18 and C 110, respectively, have the same polarity.

A delay clock pulse width setting circuit 120 generates a delay clock pulse signal 122 whose pulse width is equal to a delay period set by a delay setting terminal 121 based on the output signals A 116 and B 117. The delay clock pulse signal 122 is inputted to a gate of a switching transistor 125 connected between an OSC terminal 123 and a GND 124.

Besides, between the OSC terminal 123 and the GND 124, a ramp wave generation capacitor 158 is connected.

When the delay clock pulse signal 122 is in a low level, the ramp wave generation capacitor 158 is charged by an OSC constant current circuit 155 which generates a constant current determined by an external resistance and an internal reference voltage. When the delay clock pulse signal 122 is in a high level, the charged ramp wave generation capacitor 158 is quickly discharged by the switching transistor 125, forming a ramp wave signal 135.

In an error amplification circuit 126, a first reference voltage source 129 is connected to a positive input terminal 127, and a monitor signal voltage 130 is inputted to a negative input terminal 128. The voltages at the positive input terminal 127 and at the negative input terminal 128 are compared and the difference between them is amplified to form an error signal 131, which is inputted to a comparator.

This comparator is a PWM comparator 132. To a positive input terminal 133 of the PWM comparator 132, the error signal 131, which is an output of the error amplification circuit 126, is inputted. To a negative input terminal 134 of the PWM comparator 132, the ramp wave signal 135, formed according to the delay clock pulse signal 122, is inputted via a level shift circuit 139. The PWM comparator 132 compares the foregoing two signals and outputs a first error detection signal 136.

The first error detection signal 136 is inputted to a set terminal 137 of the PWM latch circuit 114 as an input signal only when the delay clock pulse signal 122 formed by the delay clock pulse width setting circuit 120 is in a low level, that is, only when either the output signal A 116 or the output signal B 117 is in a high level.

When the foregoing input signal is inputted to the set terminal 137, the polarities of the output signals C 118 and D 119 are reversed, compared with the case where the PWM latch circuit 114 is in a reset state. The PWM latch circuit 114, once set, keeps the output high until being reset by the delay clock pulse signal 122.

This structure suppresses the possibility that the monitor signal voltage 130 inputted to the negative input terminal 128 of the error amplification circuit 126 may fluctuate (vary substantially) due to that the output of the PWM latch circuit 114 becomes high.

Oscillation of an output signal can be prevented by providing a latch operation in the system. However, while a signal is being inputted to a reset terminal 138 of the PWM latch circuit 114, that is, during the delay period of either the output circuit A 17 or the output circuit B 18, the output of the PWM latch circuit 114 always becomes low.

In this manner, when used in a resonant switching regulator, for example, the foregoing structure can solve the problem that linearity in phase deviation of each of the paired output signals A 116 and D 119 and the paired output signals B 117 and C 118 cannot be obtained.

That is, in the foregoing structure, when used in a resonant switching regulator, a delay is applied to each output signal inputted to a switch of the resonant switching regulator when the output signal rises, so as to achieve soft switching which reduces switching loss. During the delay period, each switch is in a nonconducting state, which means dead time. During the dead time, a current is not transmitted through a primary of a transformer, and thus power is hardly supplied to a secondary. Therefore, during this dead time, there is no need to sample an output voltage of the secondary.

Hence, in the phase control circuit of the present invention, the timing to reset the PWM latch circuit 114 is completed within a delay period, which is the dead time of the resonant switching regulator. Further, set input is prevented during the reset timing.

Thus, in the foregoing structure, the delay clock pulse width setting circuit 120 NORs the output signals A 116 and B 117 to produce the delay clock pulse signal 122. By using the delay clock pulse signal 122 as a reset signal for the PWM latch circuit 114 and as a signal for generating a ramp wave signal, the delay period, which is the dead time period, is used as a period to reset the PWM latch circuit 114.

With this structure, in the vicinity of the minimum voltage of the ramp wave signal 135, which is in question, since the clock signal 12 determined by the oscillation frequency is not used as a reset signal for the PWM latch circuit 114, the phases of the paired switches can be deviated from 0 degree to 180 degrees without being limited by the width of the clock signal 12. As a result, linearity in phase deviation is prevented from being impaired.

Second Embodiment

Figure 2:
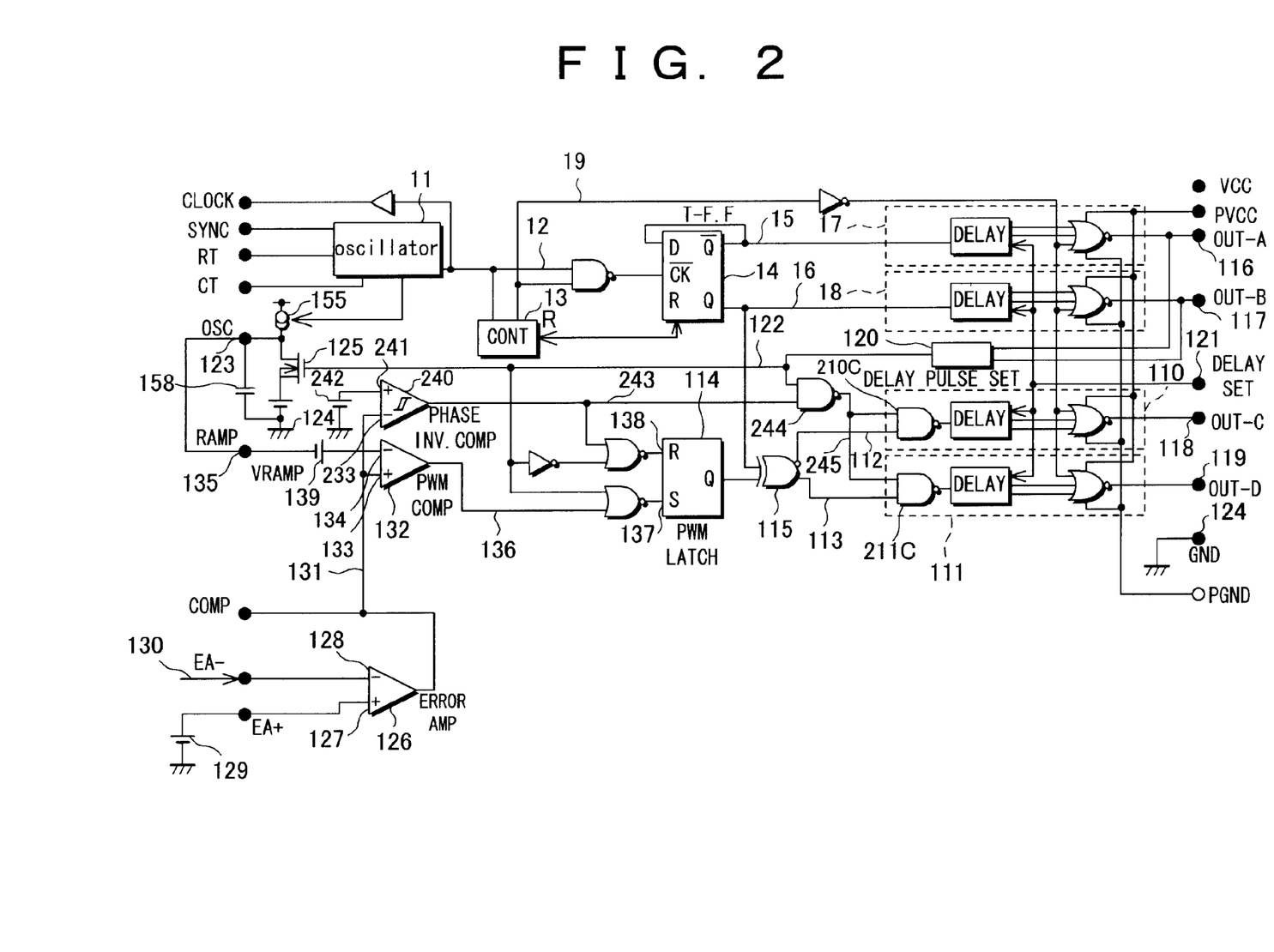
FIG. 2 is a block diagram showing another embodiment of a phase control circuit of the present invention.

FIG. 2 shows another embodiment of a phase control circuit of the present invention as a second embodiment. In the second embodiment, the members having the same structure (function) as those in the first embodiment will be designated by the same reference numerals and their description will be omitted.

The error signal 131, which is an output of the error amplification circuit 126, is inputted to a negative input terminal 233 of a phase inversion comparator 240, and a second reference voltage source 242 is connected to a positive input terminal 241 of the phase inversion comparator 240. As for the phase inversion comparator 240, a comparator with hysteresis is appropriate for use, considering that its output might fluctuate.

A second error detection signal 243 outputted from the phase inversion comparator 240 controls an input signal to the reset terminal 138 of the PWM latch circuit 114.

When the voltage level of the error signal 131 becomes lower than the voltage level of the second reference voltage source 242 (that is, when the output voltage of the resonant switching regulator reaches the maximum tolerable output value), the second error detection signal 243 performs the following control. That is, even if the delay clock pulse signal 122 in a high level is inputted, no signal is inputted to the reset terminal 138 of the PWM latch circuit 114 (the output of the PWM latch circuit 114 is maintained in a low level). If a signal (in a high level) is inputted to the set terminal 137 of the PWM latch circuit 114 even just once, the output of the PWM latch circuit 114 is kept high until the second error detection signal 243 becomes low.

With this structure, the switching is continued, with the polarities of the output signals A 116 and D 119 and the polarities of the output signals B 117 and C 118 reversed (phase deviation of 180 degrees). Thus, when the foregoing phase control circuit is used in a resonant switching regulator, no voltage is supplied to the output terminal of the resonant switching regulator. That is, it is ensured that the output of the resonant switching regulator is prevented from exceeding the maximum tolerable output value.

Meanwhile, when the output of the error amplification circuit 126 reduces to a certain level as described above, the polarity of the output signal D 119 and the polarity of the output signal C 118 are reversed with respect to that of the output signal A 116 and the output signal B 117, respectively, so as to prevent excessive output. Here, the delay circuits 17A, 18A, 110A, and 111A introduce delay periods (delay time) respectively to the output signals A 116, B 117, C 118, and D 119 when the signals rise. However, if the delay periods are all identical, the rising timings of the output signals A 116 and C 118, and the rising timings of the output signals B 117 and D 119 become identical.

Hence, the second error detection signal 243 and the delay clock pulse signal 122 are inputted to a NAND circuit (second delay means) 244 SO as to generate a second delay clock pulse signal 245. The second delay clock pulse signal 245 controls the output signals XC 112 and XD 113, which are XOR output signals. That is, while the second delay clock pulse signal 245 is outputted, the signals XC 112 and XD 113 are fixed to a high level, and as a result, the output signals C 118 and D 119 are fixed low.

With this structure, even if the delay settings in the output circuits A 17, B 18, C 110, and D 111 are identical, when the second error detection signal 243 becomes low, the rising timing of the output signal C 118 and the rising timing of the output signal D 119 are delayed with respect to that of the output signal A 116 and that of the output signal B 117, respectively, by the pulse width of the second delay clock pulse signal 245.

Therefore, in the foregoing structure, by using the second delay clock pulse signal 245, the rising timings of the output signals which are not originally paired are deviated from each other when they are in phase. Thus, the simultaneous turning on of the switches which are not paired can be avoided, and stress on the switches, which has been a problem in a conventional structure, can be reduced.

With this structure, in a resonant switching regulator using the foregoing phase control circuit, the deterioration of the switches can be suppressed. As a result, the operation of the resonant switching regulator can be stabilized, and its operation life can be prolonged.

Third Embodiment

Figure 3:
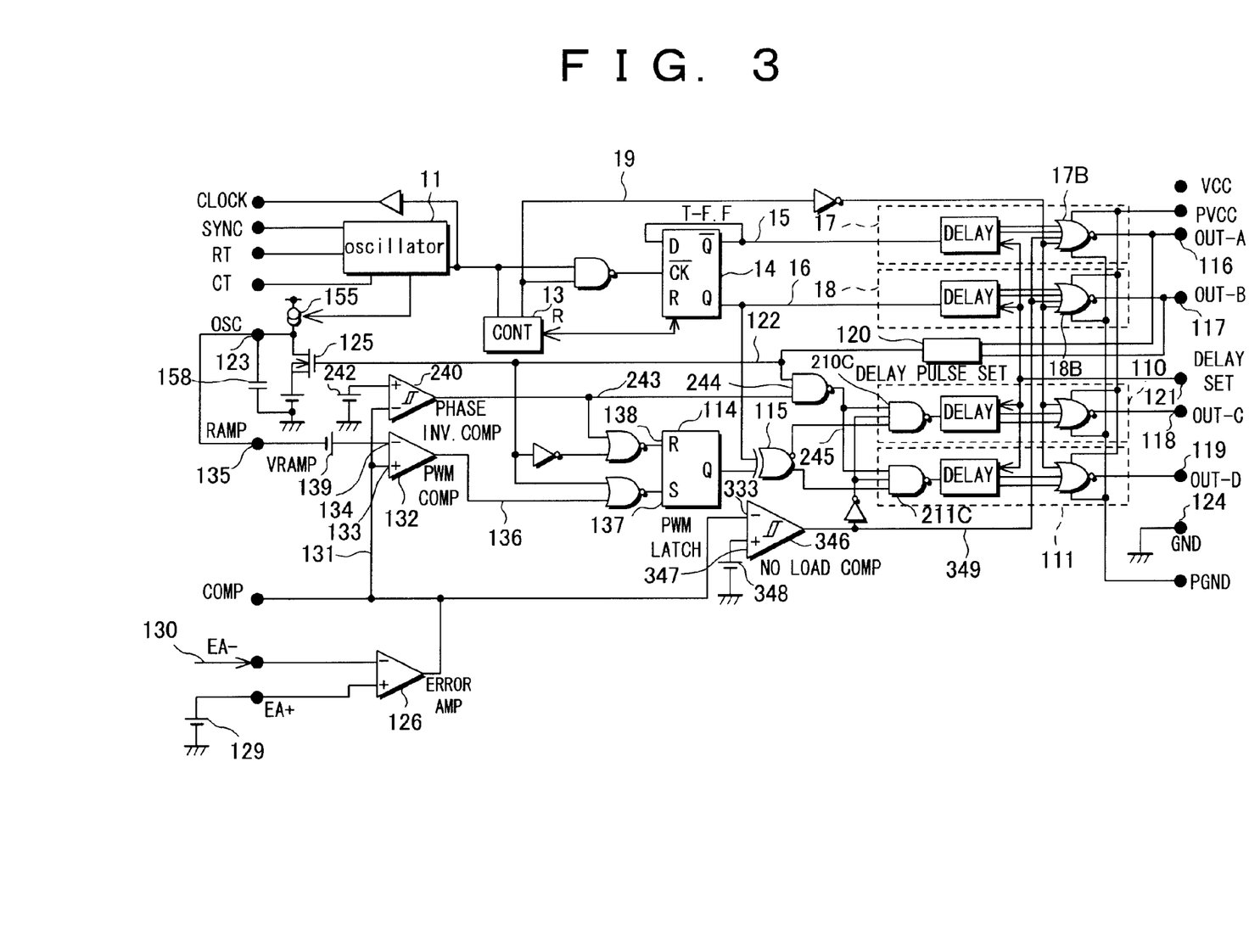
FIG. 3 is a block diagram showing still another embodiment of a phase control circuit of the present invention.

FIG. 3 shows still another embodiment of a phase control circuit of the present invention as a third embodiment. In the third embodiment, the members having the same structure (function) as those in the first and the second embodiments will be designated by the same reference numerals and their description will be omitted.

The error signal 131, which is an output of the error amplification circuit 126, is inputted to a negative input terminal 333 of an intermittent operation comparator 346, and a third reference voltage source 348 is connected to a positive input terminal 347 of the intermittent operation comparator 346. As for the intermittent operation comparator 346, a comparator with hysteresis is appropriate for use, considering that its output might fluctuate.

The intermittent operation comparator 346 outputs a third error detection signal 349 when the voltage level of the error signal 131 becomes lower than the voltage level of the third reference voltage source 348, and keeps the voltage levels of the output signals A 116, B 117, C 118, and D 119 in a low level.

With this structure, the resonant switching regulator which operates in response to these output signals can be operated intermittently.

Further, in order to prevent the rising timings of the output signals C 118 and D 119 from coinciding with those of the output signals A 116 and B 117, respectively, when the third error detection signal 349 becomes low, the output circuits A 17 and B 18 are controlled by the third error detection signal 349 in the first logic circuits 17B and 18B, respectively, and the output circuits C 110 and D 111 are controlled by the third error detection signal 349 in second logic circuits 210C and 211C, respectively.

Thus, even when the third error detection signal 349 becomes low, delays are respectively applied as predetermined when the output signals C 118 and D 119 rise, and the rising timings of the output signals which are not paired are deviated from each other when they are in phase. Consequently, stress on the switches, which has been a problem in a conventional structure, can be reduced.

Fourth Embodiment

Figure 4:
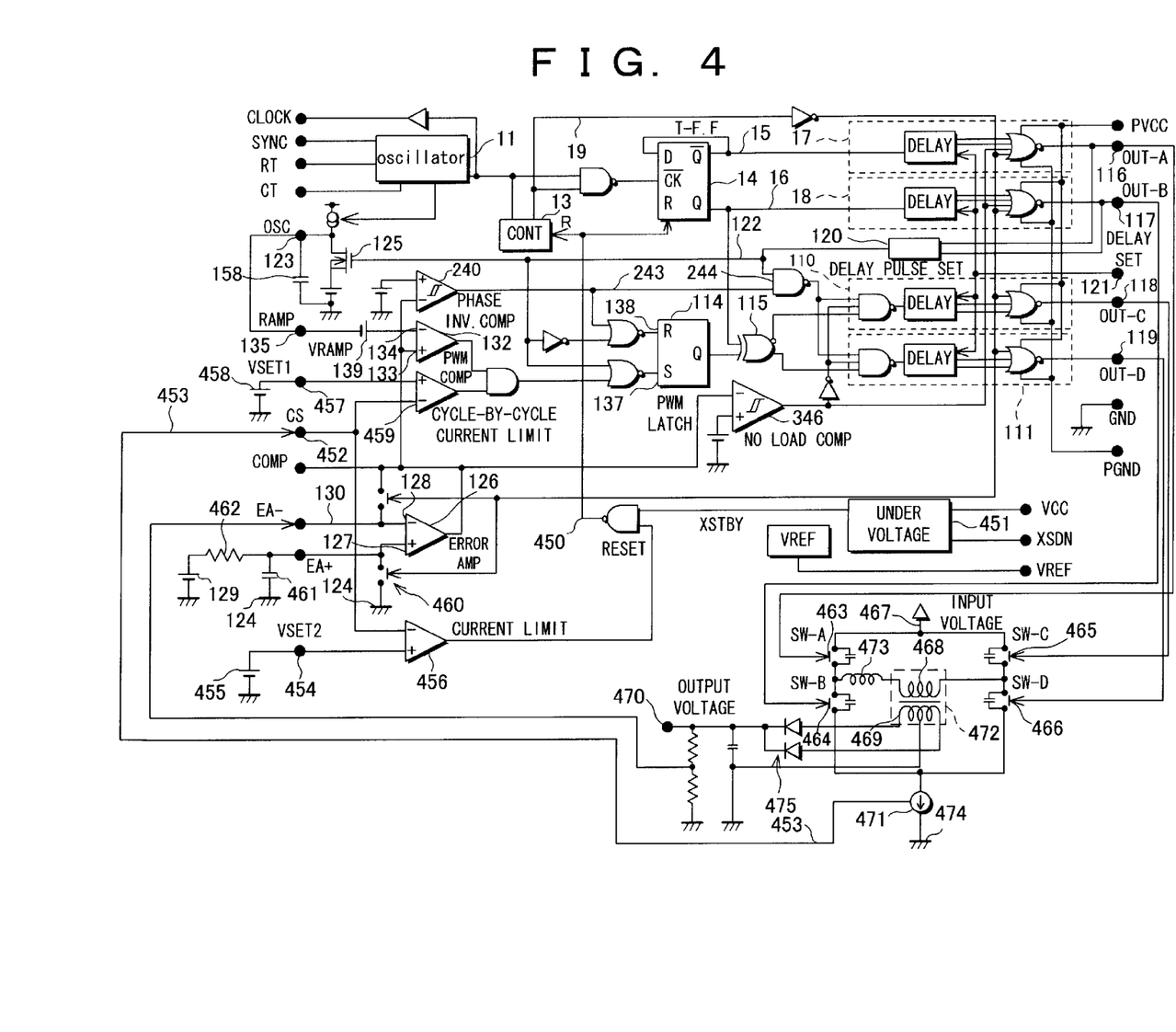
FIG. 4 is a block diagram showing a resonant switching regulator using still another embodiment of a phase control circuit of the present invention.
Figure 5:
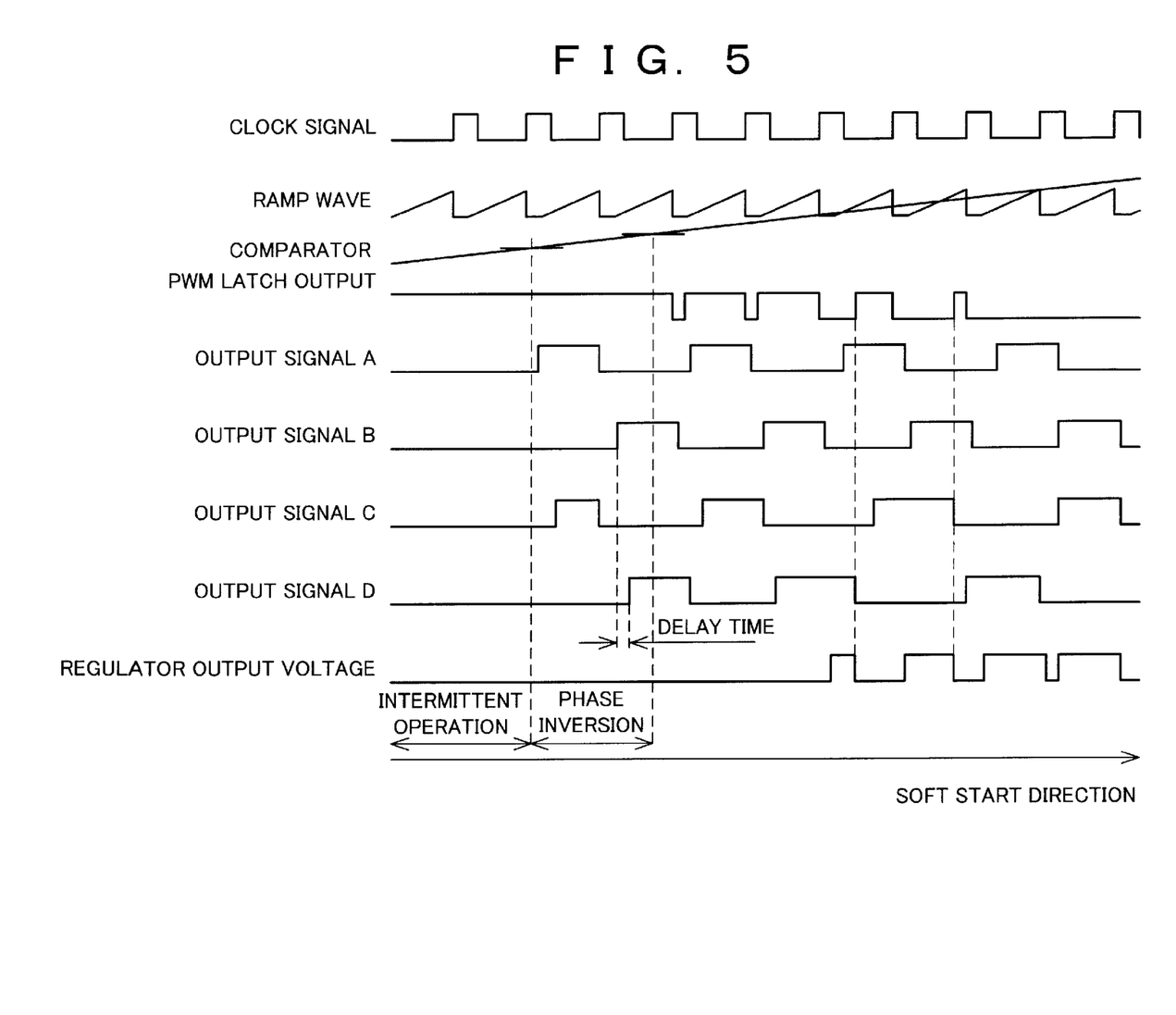
FIG. 5 is a timing chart of the phase control circuit and the resonant switching regulator of the present invention shown in FIG. 4.

FIG. 4 shows still yet another embodiment of a phase control circuit of the present invention as a fourth embodiment, and one embodiment of a switching regulator in accordance with the present invention. FIG. 5 shows a timing chart of the circuit shown in FIG. 4. In the present embodiment, the members having the same structure (function) as those in the first through the third embodiments will be designated by the same reference numerals and their description will be omitted.

In the foregoing switching regulator, the output signals A 116, B 117, C 118, and D 119 in the foregoing phase control circuit are inputted to switches A 463, B 464, C 465, and D 466, respectively, and the switching of each switch is controlled so as to control output voltage of the switching regulator.

When the switches A 463 and D 466, or the switches B 464 and C 465, are in a conducting state, a current from an input power source is transmitted through a primary 468 of a transformer 472, which makes a secondary 469 of the transformer 472 supply power via a rectifier circuit 475 to a regulator output terminal 470.

When controlling the switching timings of the four switches to convert the voltage of a regulator input terminal 467 to the voltage of the regulator output terminal 470, there is a problem, that is, switching loss caused when power is consumed for charging and discharging a parasitic capacitor in each switch at the time of switching.

To solve the problem, a delay period is set in the conduction start timing of each switch, and the parasitic capacitor in a switch is charged and discharged during the delay period by the resonance of the parasitic capacitor in each switch and a coil 473, thus decreasing switching loss.

To perform switching using resonance so as to decrease switching loss is called soft switching, and a regulator which performs soft switching is called a resonant switching regulator. The delay period set by the delay setting terminal 121 is determined based on the frequency of the resonance for decreasing switching loss. For example, the delay period is set to one cycle or a half cycle of the foregoing resonance frequency.

The circuit shown in FIG. 4 has a function that a delay period applied when a signal rises is set when the polarity of the output signal D 119 is reversed with respect to that of the output signal A 116, or the polarity of the output signal C 118 is reversed with respect to that of the output signal B 117. By this function, the rising timing of the output signal C 118 and the rising timing of the output signal D 119 are delayed with respect to that of the output signal A 116 and that of the output signal B 117, respectively, by the time set by the delay clock pulse width setting circuit 120.

By this function, the rising timings of the output signals which are not paired are deviated from each other, decreasing excessive voltage generated across the switches, which is caused when the transformer 472 is not in a transmission state and the voltage of the regulator input terminal 467 is high. As a result, damage to the switches can be reduced.

Further, the following functions are also provided to the foregoing phase control circuit and the switching regulator.

A low voltage detection circuit 451 monitors the voltage of the power source, and when the voltage of the power source becomes lower than a predetermined voltage, the low voltage detection circuit 451 outputs a standby signal 450. The standby signal 450 fixes all the output signals from the output circuits in a low level and places the phase control circuit in a standby condition, so as to prevent a malfunction of the phase control circuit.

A current monitor circuit 471 is connected between the switches B 464 and D 466 of the resonant switching regulator and a regulator GND terminal 474, and a current monitor signal 453, which is formed by converting a current flowing through the current monitor circuit 471 to a voltage, is inputted to a CS (current sense) terminal 452.

If the voltage level of the current monitor signal 453 inputted to the CS terminal 452 becomes not less than the voltage level of a setting voltage 455 applied to a VSET2 terminal 454 (that is, when a short occurs on an input side), a short current prevention circuit 456 judges that a current exceeding the tolerable amount is flowing through the switching regulator. Then, the short current prevention circuit 456 makes all the output signals low, and makes all the switches in the resonant switching regulator in a nonconducting state, so as to recover from the short condition immediately.

A peak current detection circuit 459 compares the voltage level of the current monitor signal 453 inputted to the CS terminal 452 and the voltage level of a setting voltage 458 applied to a VSET1 terminal 457, similarly as the short current prevention circuit 456. When the voltage level of the current monitor signal 453 becomes not less than the voltage level of the VSET1 terminal 457, the peak current detection circuit 459 inputs a signal to the set terminal 137 of the PWM latch circuit 114 only when the delay clock pulse signal 122 is not inputted, in the same way as the PWM comparator 132. Thus, the polarities of the paired output signals are reversed. With this structure, when a short occurs on an input side, recovery from the short condition can be immediately carried out also by the peak current detection circuit 459.

A soft start circuit 460 gradually increases the amount of the power supplied for the output voltage of the resonant switching regulator from 0 when the switching regulator is activated. This is to prevent that, due to the flow of an excessive inrush current generated in a transformer or a condenser when the switching regulator is activated, the input voltage varies and influences other loads. In the soft start circuit 460, a soft start capacitor 461 is connected between the positive input terminal 127 of the error amplification circuit 126 and the GND 124, and a soft start resistor 462 is connected between the first reference voltage source 129 and the positive input terminal 127.

When turning on the power source or in a standby condition, a short occurs between the positive input terminal 127 and the GND 124. When the standby condition is cancelled, the counter 13 operates until the output from the oscillator 11 becomes stable, and after the counter 13 operates for a predetermined period, the foregoing short condition is also cancelled. Thus, the voltage applied to the positive input terminal 127 gradually increases up to the voltage of the first reference voltage source 129, according to a time constant determined by the soft start capacitor 461 and the soft start resistor 462. Accordingly, the phase of the output signal also gradually shifts so as to supply power, achieving a soft start.

A phase control circuit of the present invention may be structured for controlling a first, a second, a third, and a fourth switches of a resonant switching regulator by a first, a second, a third, and a fourth output signals, respectively, the phase control circuit including:
  a first switching circuit for switching the first and the second output signals;
  a delay circuit for outputting an inverse signal whose rising or falling is delayed with respect to the first and the second output signals, by one cycle or a half cycle of a resonant circuit, so as to control the first switching circuit;
  a second switching circuit for switching the third and the fourth output signals; and
  a PWM circuit which provides inversion control on the third and the fourth output signals with respect to the first and the second output signals, respectively, based on a input signal fed back from the output of the switching regulator;
  the switching regulator including:
    a first half bridge circuit in which the first and the second switches are connected in series; and
    a second half bridge circuit in which the third and the fourth switches are connected in series,
    wherein a primary of a transformer and the resonant circuit for soft switching to reduce switching loss of the first and the second half bridge circuits are connected in series between the first and the second half bridge circuits, and
    a phase of an inversion output of the second half bridge circuit is controlled with respect to an inversion output of the first half bridge so as to adjust a current generated at a secondary of the transformer and to obtain a voltage desired for a smoothing output voltage of a rectifier circuit connected to the secondary of the transformer.

According to the foregoing structure, by using a pulse signal whose pulse width is equal to a delay period of the delay circuit as a reset signal for the PWM circuit, the PWM circuit is reset in dead time of the resonant switching regulator. Thus, the phase deviations of the third and the fourth output signals can be controlled with linearity, from 0 degree to 180 degrees, with respect to the first and the second signals, respectively, without being influenced by the variation in the switching frequency, which permits satisfactory voltage control.

A phase control circuit of the present invention may be arranged so as to include:
  an oscillator which supplies a clock signal from an output terminal;
  a counter circuit which has a first input terminal connected to the output terminal of the oscillator, a second input terminal to which a reset signal is inputted, and an output terminal;
  a first logic circuit which has a first input terminal connected to the output terminal of the oscillator, a second input terminal connected to the output terminal of the counter circuit, and an output terminal;
  a switching circuit which has an input terminal connected to the output terminal of the first logic circuit, and a first and a second output terminals;
  a first output circuit which has a first input terminal connected to the first output terminal of the switching circuit, a second input terminal connected to the output terminal of the counter circuit, and an output terminal and a delay control terminal;

a second output circuit which has a first input terminal connected to the second output terminal of the switching circuit, a second input terminal connected to the output terminal of the counter circuit, and an output terminal and a delay control terminal;

a delay clock pulse width setting circuit which has a first input terminal connected to the output terminal of the first output circuit, a second input terminal connected to the output terminal of the second output circuit, and an output terminal;

a pulse width modulation circuit which has a first input terminal connected to the output terminal of the delay clock pulse width setting circuit, and a second input terminal and a first output terminal;

an error amplification circuit which has a first input terminal to which a monitor signal is inputted, a second input terminal connected to a reference voltage source, and an output terminal connected to the second input terminal of the pulse width modulation circuit;

a second logic circuit which has a first input terminal connected to the second output terminal of the switching circuit, a second input terminal connected to the first output terminal of the pulse width modulation circuit, and a first and a second output terminals;

a third output circuit which has a first input terminal connected to the first output terminal of the second logic circuit, a second input terminal connected to the output terminal of the counter circuit, and an output terminal and a delay control terminal; and a fourth output circuit which has a first input terminal connected to the second output terminal of the second logic circuit, a second input terminal connected to the output terminal of the counter circuit, and an output terminal and a delay control terminal.

The phase control circuit of the present invention may be further arranged so as to include a pulse width modulation circuit which has a second output terminal connected to a third input terminal of the third output circuit and to a third input terminal of the fourth output circuit.

The phase control circuit of the present invention may be further arranged so as to include a pulse width modulation circuit which has a second output terminal connected to a third input terminal of the first output circuit, to a third input terminal of the second output circuit, to a third input terminal of the third output circuit and to a third input terminal of the fourth output circuit.

The phase control circuit of the present invention may be further arranged so as to include a pulse width modulation circuit which has a third output terminal connected to a third input terminal of the first output circuit, to a third input terminal of the second output circuit, to a fourth input terminal of the third output circuit and to a fourth input terminal of the fourth output circuit.

The phase control circuit of the present invention may be further arranged so as to include the first, the second, the third, and the fourth output circuits;

each of the first and the second output circuits being made up of:
(1) a first time delay circuit which has a first input terminal connected to the output terminal of the switching circuit, a second input terminal connected to the delay control terminal, and an output terminal, and (2) a first output section logic circuit which has a first input terminal connected to the first input terminal of the first time delay circuit, a second input terminal connected to the output terminal of the first time delay circuit, a third input terminal connected to the output terminal of the counter circuit, a fourth input terminal connected to the third output terminal of the pulse width modulation circuit, and an output terminal;

each of the third and the fourth output circuits being made up of:
(1) a second output section logic circuit which has a first input terminal connected to the output terminal of the second logic circuit, a second input terminal connected to the second output terminal of the pulse width modulation circuit, a third input terminal connected to the third output terminal of the pulse width modulation circuit, and an output terminal;

(2) a second time delay circuit which has a first input terminal connected to the output terminal of the second output section logic circuit, a second input terminal connected to the delay control terminal, and an output terminal; and (3) a third output section logic circuit which has a first input terminal connected to the output terminal of the second output section logic circuit, a second input terminal connected to the output terminal of the second time delay circuit, a third input terminal connected to the output terminal of the counter circuit, and an output terminal.

The phase control circuit of the present invention may be further arranged so as to include a pulse width modulation circuit which includes:

a level shift circuit which has an input terminal and an output terminal, and there is a voltage difference between the two terminals;

a first error voltage detection circuit which has a first input terminal connected to the output terminal of the error amplification circuit, a second input terminal connected to the output terminal of the level shift circuit, and an output terminal;

a second error voltage detection circuit which has a first input terminal connected to the output terminal of the error amplification circuit, a second input terminal connected to a second reference voltage source, and an output terminal outputting a second error detection signal;

a third logic circuit which has a first input terminal connected to the output terminal of the second error voltage detection circuit, a second input terminal connected to the first output terminal of the delay clock pulse width setting circuit, and an output terminal;

a fourth logic circuit which has a first input terminal to which a first error detection signal is inputted from the output terminal of the first error detection circuit, a second input terminal connected to the second output terminal of the delay clock pulse width setting circuit, and an output terminal;

a pulse width modulation latch circuit which has a first input terminal connected to the output terminal of the third logic circuit, a second input terminal connected to the output terminal of the fourth logic circuit, and an output terminal connected to the second input terminal of the second logic circuit; and a fifth logic circuit which has a first input terminal connected to the second output terminal of the delay clock pulse width setting circuit, a second input terminal connected to the output terminal of the second error detection circuit, and an output terminal connected to the second input terminal of the second output section logic circuit, wherein, by means of the second error detection signal outputted from the second error voltage detection circuit, the polarity of the fourth output signal outputted from the output terminal of the fourth output circuit is reversed with respect to that of the first output signal outputted from the output terminal of the first output circuit, and the polarity of the third output signal outputted from the output terminal of the third output circuit is reversed with respect to that of the second output signal outputted from the output terminal of the second output circuit, and even if a delay period of each output circuit is set identical, while the second error detection signal is being outputted from the output terminal of the second error voltage detection circuit, the rising timing of the third output signal outputted from the output terminal of the third output circuit is delayed with respect to that of the first output signal outputted from the output terminal of the first output circuit, and the rising timing of the fourth output signal outputted from the output terminal of the fourth output circuit is delayed with respect to that of the second output signal outputted from the output terminal of the second output circuit, by the period of pulse width set by the delay clock pulse width setting circuit.

The phase control circuit of the present invention may be further arranged so as to include a third error detection circuit which has a first input terminal connected to the output terminal of the error amplification circuit, a second input terminal connected to a third reference voltage source, and an output terminal providing a third error voltage detection signal; and an intermittent operation circuit which, according to an output voltage level of the error amplification circuit, sets the level of the output signal of each output circuit to a low level, or cancels the low mode setting for the third and the fourth output circuits after the delay period so as to prevent the output signals of the first and the second output circuits and those of the third and the fourth output circuits from rising simultaneously at the moment the low mode setting is cancelled, by means of the first output section logic circuit which sets the output signals of the first and the second output circuits in a low level and the third output section logic circuit which sets the output signals of the third and the fourth output circuits in a low level, both in response to the third error voltage detection signal.

A phase control circuit of the present invention may be structured for controlling a first, a second, a third, and a fourth switches of a resonant switching regulator by a first, a second, a third, and a fourth output signals, respectively, the resonant switching regulator including:

a first half bridge circuit made up of the first and the second switches; and a second half bridge circuit made up of the third and the fourth switches, wherein a primary of a transformer is connected between the first and the second half bridge circuits, so that a secondary of the transformer supplies power when the first and the fourth switches are conducting, or when the second and the third switches are conducting, the phase control circuit structured such that:

the first output signal outputted from an output terminal of a first output circuit is inputted to the first switch;

the second output signal outputted from an output terminal of a second output circuit is inputted to the second switch;

the third output signal outputted from an output terminal of a third output circuit is inputted to the third switch;

the fourth output signal outputted from an output terminal of a fourth output circuit is inputted to the fourth switch;

the switching phase of the fourth switch with respect to the first switch, and the switching phase of the third switch with respect to the second switch, are varied by varying the polarities of the fourth and the third output signals with respect to the first and the second output signals, respectively, according to a voltage level of a monitor signal inputted to an input terminal of an error amplification circuit;

an output voltage outputted by a secondary of a transformer is controlled to be a desired voltage;

when an output voltage of the error amplification circuit reaches a condition to output a second error detection signal according to the voltage level of the monitor signal, by reversing the polarities of the fourth and the third output signals with respect to the first and the second output signals, respectively, the switching phases of the fourth and the third switches are reversed with respect to the first and the second switches, respectively;

a transmission of a current through the primary of the transformer is stopped; and the conduction start timing of the first switch and that of the third switch, or the conduction start timing of the second switch and that of the fourth switch, are deviated by a delay clock pulse width setting circuit, even when a delay period set for each output circuit is identical.

According to the foregoing structure, excessive voltage generated across the switches when the transformer is not in a transmission state can be reduced. Consequently, when using the foregoing structure in a switching regulator, the operation of the switching regulator can be stabilized, and its operation life can be prolonged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A phase control circuit comprising:

a first pair of output stages for generating a first output signal and a second output signal based on a clock signal so that said first and said second output signals are pulse signals having opposite polarities;

a second pair of output stages, reset by a reset signal, for generating a third output signal and a fourth output signal which have phases controlled with respect to the first and the second output signals by the first and the second output signals respectively and also by a set signal produced based on a control signal, so that said third and said fourth output signals are pulse signals having opposite polarities;

first delay means for delaying, before output, the rising of the first through the fourth output signals; and delay pulse means for generating a delay pulse based on low level periods of the delayed first and second output signals, and for resetting said second pair of output stages using said delay pulse as said reset signal.

2. The phase control circuit of claim 1, wherein:

a delay period is provided so as to reduce switching loss in a resonant switching regulator to which the first through the fourth output signals are connected.

3. The phase control circuit of claim 1, wherein:

said control signal is a monitor signal in accordance with an output voltage of a resonant switching regulator to which the first through the fourth output signals are connected.

4. The phase control circuit of claim 2, wherein:

said control signal is a monitor signal in accordance with an output voltage of a resonant switching regulator to which the first through the fourth output signals are connected.

5. The phase control circuit of claim 1, further comprising blocking means for blocking an input of a set signal to said second pair of output stages in a reset state, based on said delay pulse.

6. The phase control circuit of claim 2, further comprising blocking means for blocking an input of a set signal to said second pair of output stages in a reset state, based on said delay pulse.

7. The phase control circuit of claim 1, further comprising second delay means for further delaying the third and the fourth output signals according to a period of said delay pulse.

8. The phase control circuit of claim 2, further comprising second delay means for further delaying the third and the fourth output signals according to a period of said delay pulse.

9. The phase control circuit of claim 1, further comprising comparison means for detecting said control signal, so as to set all the first through the fourth output signals to a low level when said control signal becomes higher than a predetermined value.

10. The phase control circuit of claim 9, wherein:

when cancelling a low level setting for each output signal, said comparison means cancels the low level settings for the first and the second output signals, and after a delay period, said comparison means cancels the low level settings for the third and the fourth output signals.

11. A switching regulator comprising:

a first half bridge circuit including a first switch and a second switch, connected in series, which are turned on/off according to a high/low signal;

a second half bridge circuit including a third switch and a fourth switch, connected in series, which are turned on/off according to a high/low signal;

a transformer whose primary is connected to said first and second half bridge circuits;

a resonant circuit, connected between said first and second half bridge circuits in series with the primary of said transformer, for soft switching so as to decrease switching loss;

a rectifier circuit connected to a secondary of said transformer;

a control signal generator circuit for generating a control signal to feed back and control an output from said rectifier circuit, based on said output; and a phase control circuit for controlling the turning on/off of the first through the fourth switches, said phase control circuit comprising:

a first pair of output stages for generating a first output signal and a second output signal based on a clock signal so that said first and said second output signals are pulse signals having opposite polarities;

a second pair of output stages, reset by a reset signal, for generating a third output signal and a fourth output signal which have phases controlled with respect to the first and the second output signals by the first and the second output signals respectively and also by a set signal produced based on a control signal, so that said third and said fourth output signals are pulse signals having opposite polarities;

first delay means for delaying, before output, the rising of the first through the fourth output signals; and delay pulse means for generating a delay pulse based on low level periods of the delayed first and second output signals, and for resetting said second pair of output stages using said delay pulse as said reset signal, and the first through the fourth switches of said switching regulator being respectively connected to the first through the fourth output signals of said phase control circuit.

12. The switching regulator of claim 11, wherein:

a delay period is provided so as to reduce switching loss.

13. The switching regulator of claim 11, wherein:

said control signal is a monitor signal in accordance with an output voltage.

14. The switching regulator of claim 12, wherein:

said control signal is a monitor signal in accordance with an output voltage.

15. The switching regulator of claim 11, wherein:

said phase control circuit further comprises blocking means for blocking an input of a set signal to said second pair of output stages in a reset state, based on said delay pulse.

16. The switching regulator of claim 12, wherein:

said phase control circuit further comprises blocking means for blocking an input of a set signal to said second pair of output stages in a reset state, based on said delay pulse.

17. The switching regulator of claim 11, wherein:

said phase control circuit further comprises second delay means for further delaying the third and the fourth output signals according to a period of said delay pulse.

18. The switching regulator of claim 12, wherein:

said phase control circuit further comprises second delay means for further delaying the third and the fourth output signals according to a period of said delay pulse.

19. The switching regulator of claim 11, wherein:

said phase control circuit further comprises comparison means for detecting a control signal, so as to set all the first through the fourth output signals to a low level when said control signal becomes higher than a predetermined value.

20. The switching regulator of claim 19, wherein:

when cancelling a low level setting for each output signal, said comparison means cancels the low level settings for the first and the second output signals, and after a delay period, said comparison means cancels the low level settings for the third and the fourth output signals.

* * * * *